UNITED STATES PATENT OFFICE.

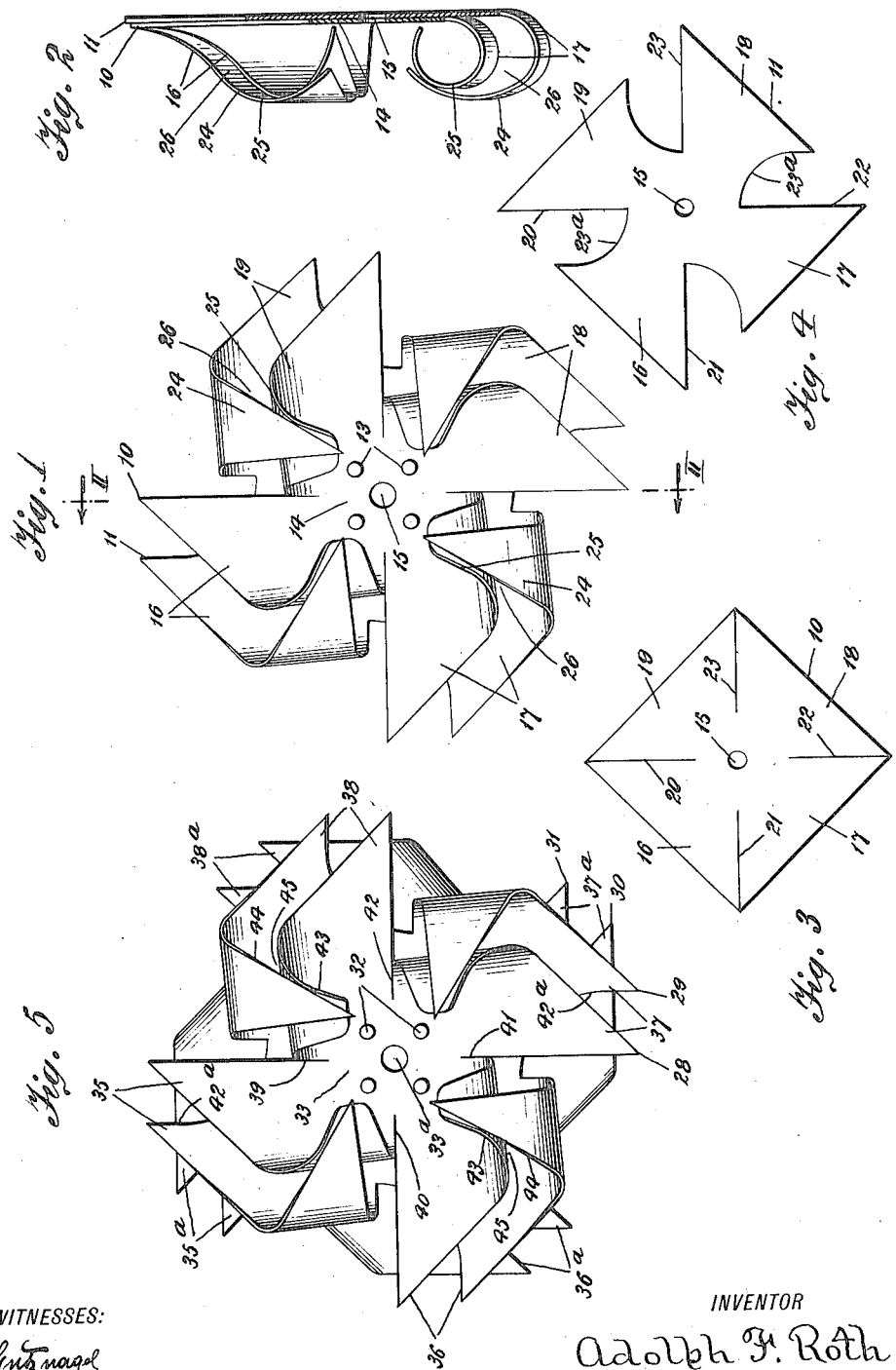

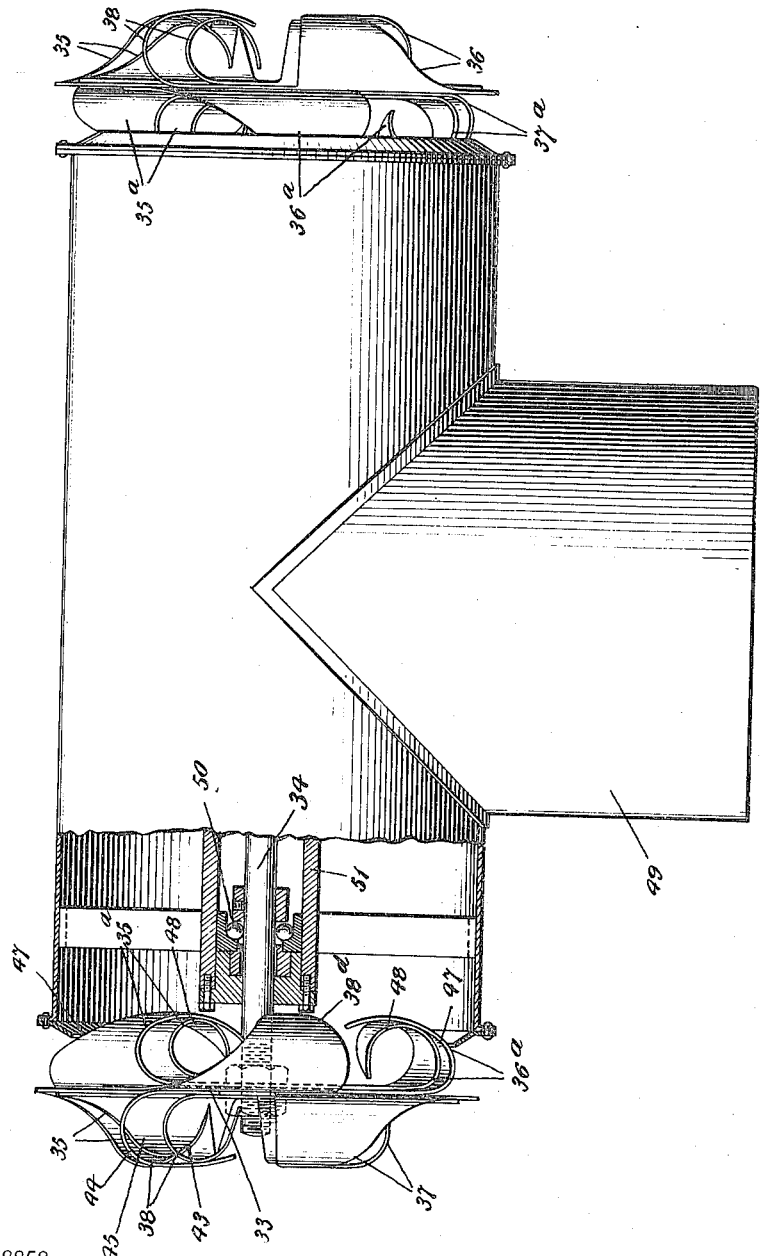

ADOLPH F. ROTH, OF NEW YORK, N. Y.

ROTARY FAN.

1,213,955. Specification of Letters Patent. Patented Jan. 30, 1917.

Application filed October 14, 1915. Serial No. 55,832.

*To all whom it may concern:*

Be it known that I, ADOLPH F. ROTH, a citizen of the United States, and a resident of New York, county and State of New York, have invented a certain new and useful Improvement in Rotary Fans, of which the following is a full, clear, and exact specification.

This invention relates to a class of devices adapted to be used for circulating air.

My invention has for its object primarily to provide a fan designed to be employed for producing a partial vacuum whereby cars, or other vehicles, chimneys, restaurants, halls, buildings and other places may be ventilated in a manner to cause effectual circulation of the air, and which may also be made for use in conjunction with a vacuum cleaner as well as with other devices wherein partial vacuum produced by air-suction are required, the fan being adapted to be made so as to be operated by currents of air, or by any suitable power driven means.

The invention consists essentially of a hub portion provided with radially disposed blades arranged in pairs, each of substantially the shape of an equilateral triangle. The blades of each pair are preferably arranged in close juxtaposition, and one of the corresponding corners of the blades of each pair is bent, or curled in substantially a cone-shape, or circular fashion in overlapping arrangement on one of the blades of its respective pair toward the hub portion of the fan to provide air-suction members.

Another object of the invention is to provide a form of the fan having radially disposed blades also of approximately equilateral triangular shapes which are arranged in two series of pairs, and one of the corresponding corners of the blades of each pair of of one series are curled in substantially a cone-shape, or circular fashion in overlapping arrangement in one direction on the blades proper, while one of the corresponding corners of the blades of each pair of the second series are similarly curled in a direction opposite to the first series whereby one series of the blades will serve to permit the fan to be driven by atmospheric pressure, this second series of the blades serving to suctionally draw air.

A further object of the invention is to provide a rotary fan of a simple and durable construction, and which combines unusual efficiency.

A practical embodiment of the invention is represented in the accompanying drawings forming a part of this specification in which similar characters of reference indicate corresponding parts in all the views, the said invention being more fully described hereinafter, and then pointed out in the claims at the end of the description.

In the drawings, Figure 1 is a front view of one form of the rotary fan embodying my invention. Fig. 2 is a sectional view taken on the line II—II of Fig. 1. Fig. 3 is a view of one of the plates used in forming the fan. Fig. 4 is a view of another plate employed in making the fan. Fig. 5 is a front view of a form of the fan having a series of pairs of blades, and Fig. 6 is an enlarged side elevation of a ventilating hood, partly broken away and partly in section, showing the manner of employing two of the fans illustrated in Fig. 5 in conjunction therewith.

When the device, or fan is made for being driven by power propelled means whereby currents of air may be circulated in cars or other vehicles, buildings and elsewhere, or when employed to produce partial vacuums in pneumatic cleaners and other devices of a like class so that the force of air caused by suction may be utilized, it is preferably formed of two plates 10 and 11 of metal each of a substantially square shape, and these plates are arranged in close juxtaposition so that two of the surfaces thereof are in opposed relation. The central parts of the plates may be connected by pins, as at 13, or in any other desired manner to provide a hub portion 14, and through the center of the plates is a hole 15 to allow the fan to be mounted on the drive shaft, or stud of the power actuated apparatus for driving the fan.

Projecting radially from the hub portion 14 of the fan are a plurality of pairs of superposed blades, preferably four pairs in number, as 16, 17, 18, 19, though forms of the fan may be made with any suitable number of blades as occasion requires. These blades are substantially the shapes of equilateral triangles, and may be formed by slitting the plates 10 and 11 from the corners thereof in converging directions, as at 20, 21, 22, 23, toward the hub portion 14, and the part of each blade of the plate 11 at each of the slits may be cut-out, as at 23ª. One of the corresponding corners of the blades of each pair of the fans are bent, or curled, at 24 and 25, in similar directions toward the hub portion in somewhat a cone-shape, or circular fashion so that the end positions of each pair of these curled parts are in overlapping arrangement on one of the surfaces of one of the blades of their respective pairs while the other portion of the curled parts are in spaced relation, as shown at 26. The curled, or cone-shaped parts are thereby disposed circumferentially with relation to the axial center of the fan for serving as suction members when the fan is revolved by drawing the air in one end of the members and circulating the air by exhausting it from the members through the other ends thereof.

When the device, or fan is made for being driven by currents of atmosphere for ventilating flues, such as chimneys and other places, it is preferably formed of four plates 28, 29, 30, 31, and these plates are arranged so that their opposed surfaces are in contacting arrangement. Each of the plates 28, 29, 30, 31 may be substantially square in shape, and the central parts of the plates may be held tightly together by pins 32, or otherwise, to form a hub portion, as 33, and through the center of the hub portion is an opening 33ª to allow the fan to be mounted on a shaft, or rod, as 34. Extending radially from the hub portion 33 of this form of the fan are two series of pairs of superposed blades, and each series is composed preferably of four pairs of the blades, as 35, 36, 37, 38 and 35ª, 36ª, 37ª, 38ª, though I may provide forms of the fan of this type having a greater, or less number of pairs of the blades. The blades of both of these series are preferably provided by similarly slitting the plates from their corners in converging directions toward the hub portion, as at 39, 40, 41, 42, like the formations of the plates 10 and 11, thereby forming the blades in approximately equilateral triangular shapes, and one part of each blade of each of the plates 29 and 30 at the slits thereof may be cut-out, as at 42ª. One of the corresponding corners of the blades of each pair of the series 35, 36, 37, 38 are bent, or curled, at 43 and 44, in like directions toward the hub portion upon one surface of one of the blades of its respective pair in somewhat a cone-shape, or circular fashion so that the end portions of each pair of the curled parts overlap, while the other portions of these curled parts are spaced from each other, at 45. One of the corresponding corners of the blades of each pair of the series 35ª, 36ª, 37ª, 38ª are also bent, or curled, at 47 and 48, in corresponding directions toward the hub portion 33 upon one surface of one of the blades of its respective pair in somewhat a cone-shape, or circular fashion so that the end portions of each pair of the curled parts are in overlapping arrangement, while the other portions of the curled parts are spaced apart. As shown, the curled parts 47 and 48 of the blades 35ª, 36ª, 37ª, 38ª are arranged in opposite directions to the curled parts 45 and 46 of the blades 35, 36, 37, 38, and all of the curled parts of this form of the fan are disposed circumferentially with respect to the axial center of the fan for also serving as suction members when the fan is revolved. When this form of the device is employed for ventilating flues, chimneys, and other places it may be applied to a well known type of T-shaped hood, as 49 Fig. 6, in which instance one of the fans is mounted on each of the ends of the shaft 34, which may be journaled in anti-friction bearings, as 50, provided in a tubular support, as 51, arranged in the transverse arms of the hood. The shaft 34 is of a length, and the transverse arms of the hood are of diameters, so that one of the series of the pairs of blades of each fan will be rotatably disposed in one of the ends of the transverse arms of the hood. In this manner when the wind is blowing the series of the pairs of the blades of the fan exposed to the wind will take the currents of atmosphere which in turn will be received in one of the ends of the curled parts, or suction members of this series of blades for being forced therethrough and exhausted out of the other ends of the curled parts. The fan will thereby be revolved for likewise rotating the shaft 35 as well as for revolving the series of the pairs of blades of both fans which are seated in the hood. The partial vacuum then produced in the hood will cause the air to be suctionally forced from the hood through the medium of the suctional action of the curled parts of the blades of the fans which are disposed therein, these curled parts, or suction members accomplishing this in a manner similar to the operation of the suction members of the fan shown in Figs. 1 and 2.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. A rotary fan of the character described, comprising a hub portion, and a plurality of pairs of superposed blades extending radially from the hub portion and the free ends of the blades of each pair being angular in shape as well as being correspondingly bent toward the hub portion upon one of the corresponding faces of one of the blades of each pair to provide an air-suction space between the blades of each pair.

2. A rotary fan of the character described, comprising a hub portion, and a plurality of pairs of superposed blades extending radially from the hub portion, and the free ends of the blades of each pair being angular in shape as well as being correspondingly bent toward the hub portion upon one of the corresponding faces of one of the blades of each pair so that parts of each pair of the bent ends are in lapping arrangement while the other parts of each pair of the bent ends are spaced apart to provide an air-suction space between the blades of each pair.

3. A rotary fan of the character described, comprising a hub portion, a plurality of pairs of superposed substantially equilateral triangular blades extending radially from the hub portion, and a plurality of approximately cone-shaped air-suction members one provided on the free ends of each pair of the blades by curling one of the corresponding corners of the blades each pair toward the hub portion upon one of the corresponding faces of one of the blades of its respective pair.

4. A rotary fan of the character described, comprising a hub portion, a plurality of pairs of superposed blades extending radially from the hub portion, and a plurality of pairs of approximately cone-shaped air-suction members one pair on each pair of the blades, and all of the air-suction members being disposed upon one of the corresponding faces of one of the blades of each pair as well as being disposed circumferentially with relation to the hub portion.

5. A rotary fan of the character described, comprising a hub portion, and two series of pairs of superposed blades extending radially from the hub portion, the free ends of each pair of one series of the blades being correspondingly bent toward the hub portion upon one of the corresponding faces of one of the blades of each pair of this series and the free ends of each pair of the second series of the blades being also correspondingly bent toward the hub portion upon one of the corresponding faces of one of the blades of each pair of said second series so as to be disposed in opposite directions to the bent ends of the pairs of blades of the first series, for the purpose specified.

6. A rotary fan of the character described, comprising a hub portion, and two series of pairs of superposed blades extending radially from the hub portion, the free ends of each pair of one series of the blades being correspondingly bent toward the hub portion upon one of the corresponding faces of one of the blades of each pair of this series so that parts of each pair of the bent ends are in lapping arrangement while the other parts of each pair of the bent ends are spaced apart, and the free ends of each pair of the second series of the blades being also correspondingly bent in opposite directions to the first series of blades toward the hub portion upon one of the corresponding faces of one of the blades of each pair of said second series so that parts of each pair of the bent ends are in lapping arrangement while the other parts of each pair of the bent ends are spaced apart, for the purpose specified.

7. A rotary fan of the character described, comprising a hub portion, two series of pairs of substantially equilateral triangular superposed blades extending radially from the hub portion, a series of pairs of inner and outer approximately cone-shaped air-suction members one pair provided on the free ends of each pair of one series of the blades by curling one of the corresponding corners of each pair of the blades toward the hub portion upon one of the corresponding faces of one of the blades of its respective pair, and a second series of pairs of inner and outer approximately cone-shaped air-suction members disposed in opposite directions to the air-suction members of the first series, one pair provided on the free ends of each pair of the blades of said second series by curling one of the corresponding corners of each pair of the blades toward the hub portion upon one of the corresponding faces of one of the blades of its respective pair.

8. A rotary fan of the character described, comprising a hub portion, two series of pairs of superposed blades extending radially from the hub portion, and two series of pairs of inner and outer approximately cone-shaped air-suction members, one pair on each pair of the blades of one series thereof, and all of these members being disposed upon one of the corresponding faces of one of the blades of each pair of this series as well as being disposed circumferentially with relation to the hub portion, and one pair of the air-suction members of the second series being provided on each pair of the blades of the second series thereof, and all the air-suction members of the second series being disposed upon one of the corresponding faces of one of the blades of each pair of said second series as well as being disposed circumferentially with relation to the hub portion.

This specification signed and witnessed this thirteenth day of October, A. D. 1915.

ADOLPH F. ROTH.

Witnesses:
 ROBT. B. ABBOTT,
 M. DERMODY.